Patented Jan. 25, 1949

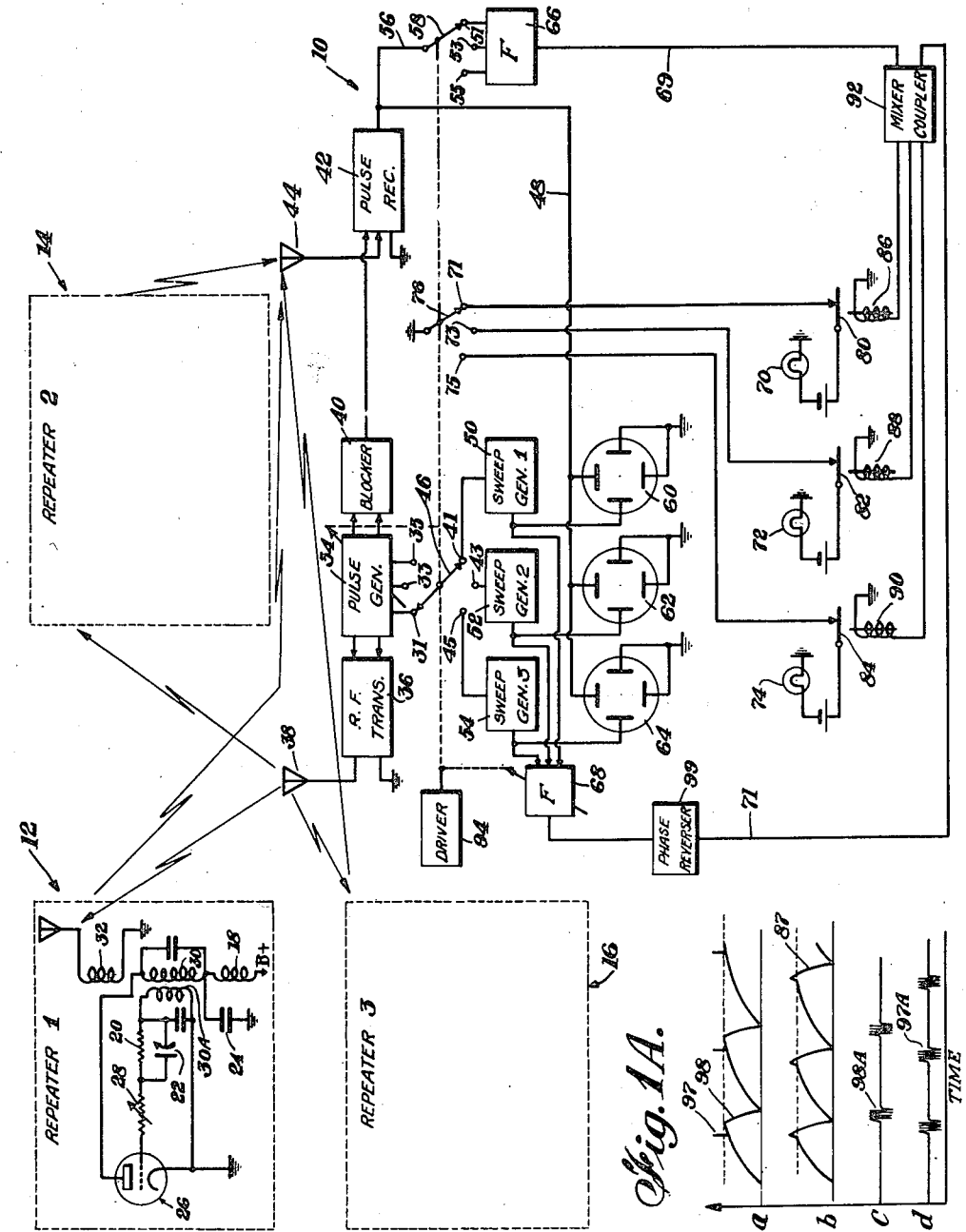
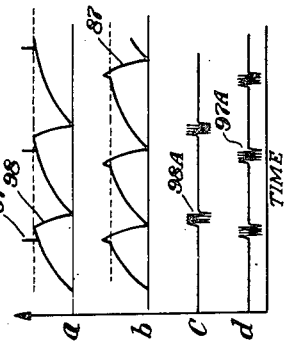

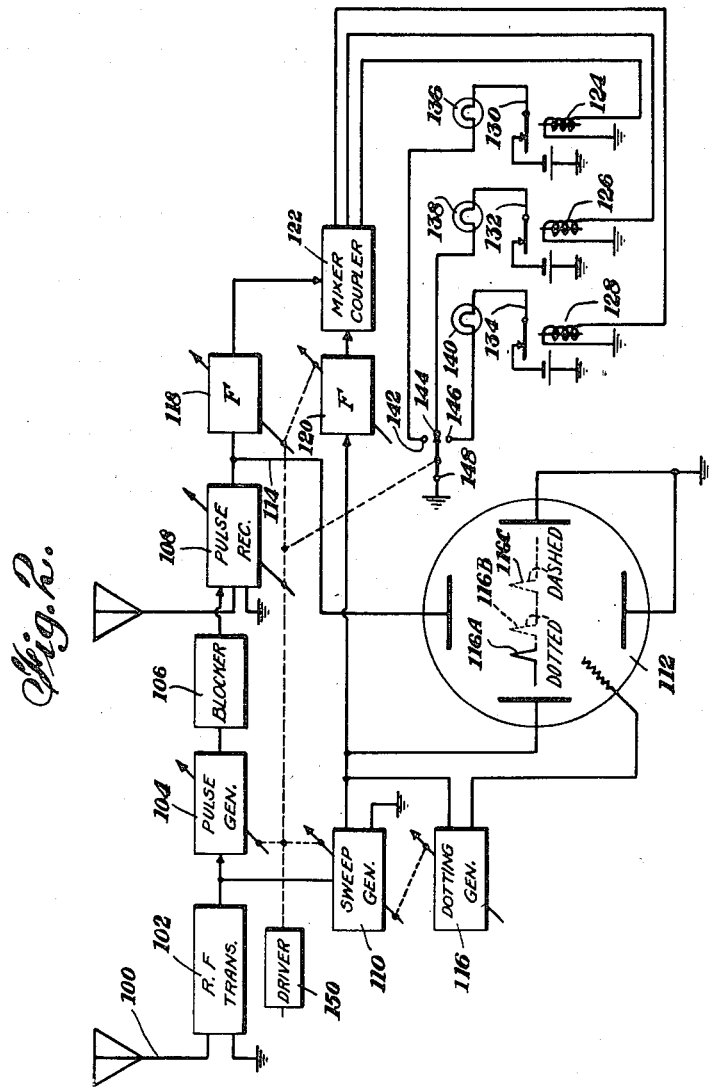

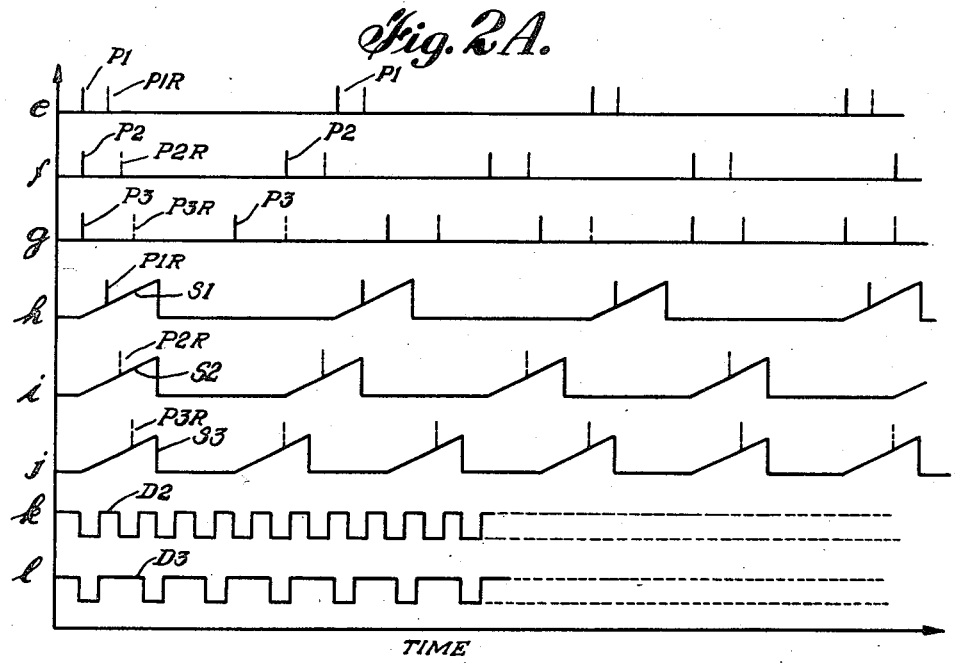
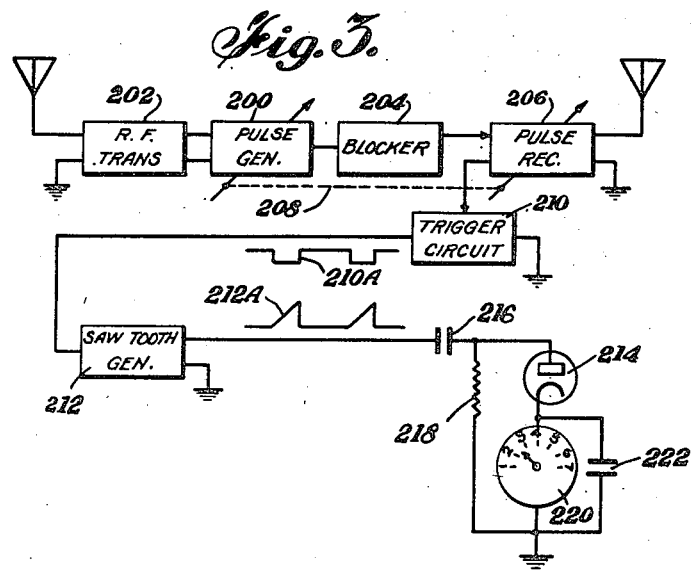
INVENTOR.
DONALD D. GRIEG
BY
ATTORNEY

2,459,811

UNITED STATES PATENT OFFICE 2,459,811

RADIO IDENTIFYING SYSTEM

Donald D. Grieg, Forest Hills, N. Y., assignor to Federal Telephone and Radio Corporation, New York, N. Y., a corporation of Delaware Application March 18, 1944, Serial No. 527,074

16 Claims. (Cl. 343—13)

This invention relates to radio identifying systems and more particularly to systems for identifying a plurality of radio stations at a particular point.

It is often desired to identify different objects located at remote points from a central position. For example, it may be desired to identify different aircraft at a single receiving station or alternatively to identify different fixed stations from a movable vehicle or aircraft.

It has been proposed to identify different fixed locations from a movable aircraft by providing repeaters at the fixed locations responsive to the signals transmitted from the aircraft. The repeated signals from these repeaters may be received on the aircraft to indicate the presence of the fixed station. These fixed stations may repeat the signal with different characteristics, for example, at different carrier frequencies, so that they may be identified one from another at the aircraft.

It is an object of the present invention to provide a radio system and method for identifying at one location objects positioned at other locations.

It is a further object of this invention to provide a system in which each of a plurality of objects located at remote points with respect to a fixed station may be individually indicated and identified at the fixed station.

It is a still further object of my invention to provide a system in which objects of different categories may be identified at a single location by means of one set of characteristic signals identifying the objects of the different categories and in which individual objects in the several categories may be individually identified by further characterstic signals.

In accordance with my invention, I provide a radio transmitting and receiving equipment located at one position for transmitting a plurality of trains of pulses at differing cadence frequency or repetition rates. At each of a plurality of other points are provided repeaters adapted to respond selectively to a train of signals having a given one of several possible repetition rates. These signals at the particular repetition rate are repeated and received again at the first named position and are used to provide an indication in response to the pulses of the particular repetition rate to identify the object and, if desired, the distance of the object from the first named position as well. The objects in a given category are preferably provided with repeaters operative at the same repetition rate. At individual ones of such objects in the same category, the pulses are repeated with different characteristics, for example, differences in width so that an indication of the individual objects within each category may also be obtained.

A better understanding of my invention and the objects and features thereof may be had by reference to the particular description of embodiments thereof made with reference to the accompanying drawing, in which:

Fig. 1 illustrates, partially in block diagram, a circuit diagram of a complete system in accordance with my invention;

Fig. 1A is a set of curves illustrating the operation of the repeaters shown in Fig. 1;

Fig. 2 is a block diagram of a modified form of transmitter receiver apparatus in accordance with my invention, which may be used in conjunction with repeaters such as shown in Fig. 1;

Fig. 2A is a set of curves used in explaining the operation of parts of the circuit of Fig. 2; and Fig. 3 is a block circuit diagram of a simplified transmitter-receiver unit which may be used in conjunction with repeaters such as shown in Fig. 1.

Turning now to Figs. 1 and 1A, 10 represents generally a transmitter-receiver unit adapted to be arranged at a particular location. This transmitter-receiver unit is provided with indicating apparatus to indicate the identity and the distance of objects 12, 14 and 16, for example, each provided with simple repeater apparatus.

Each of the simple repeaters may, for example, be of the type shown in connection with repeater 12. According to this arrangement, a form of relaxation oscillator is provided in which direct current from B+ source is applied over choke coil 18 through the plate tank circuit 30, to the plate of tube 26. A by-pass condenser 24 may be provided to by-pass to ground any high frequency components which traverse over choke coil 18. The grid of tube 26 is coupled to the plate tank circuit by means of the tuned circuit 30A. By suitable adjustment of the bias resistor and condenser combination 20, 22 a charge will be built up on the grid of tube 26 causing the energy to build up, to produce pulses as shown at 98, curve a, Fig. 1A, until the grid of tube 26 reaches such a positive or less negative value that the circuit will oscillate causing an output oscillation in tank circuit 30. This oscillation will continue until the grid voltage, curve 98, again reduces to normal, thus producing a series of output oscillation pulses, such as indicated at 98a, curve c.

These pulses may be continuously transmitted from antenna 32 so that the repeater, in effect, continuously transmits a train of pulses at a predetermined cadence frequency. Upon the receipt of pulses having a slightly higher cadence frequency than the pulses 98a the build up time of curve 98, Fig. 1A, will bring the circuit to an oscillation level at an earlier point in the normal cycle, as indicated by the pulses 97, superposed on this curve. Thus, the grid voltage of tube 26 will follow the line shown at curve b, producing pulses 97A, curve d, having a cadence frequency higher than the pulses 98A. The width of the repeated pulses is determined by the circuit constants of the relaxation oscillator. Thus, the width may be determined by adjusting variable resistor 28 to a desired value. Each of the repeater stations in the separate categories to be identified are provided with similar repeater units, the time constant circuits 20, 22 of which, however, are adjusted so that the repeaters will respond and be pulled into step with trains of pulses having different repetition rates or cadence frequencies. Thus, the objects of different categories may be identified by the different cadence frequency at which they will repeat.

Particularly, if the objects to be identified are aircraft, the simple pulsing repeater units are very useful for identifying the craft. These repeaters may be made to operate automatically requiring no attention from the pilot and are very simple and light in weight. However, when these repeaters are applied on aircraft, it may be desirable to use the same cadence frequency for all craft in a given category. It may be further desirable, however, to distinguish individual craft in each of these categories. This distinction may be obtained by giving to the repeated pulses different signal characteristics, these characteristics may be most simply obtained by varying the pulse width of the repeated pulses by a simple adjustment of the variable resistors 28.

Cooperating with the separate repeaters is provided at a given location by a transmitter-receiver unit comprising a pulse generator 34 for pulsing a radio frequency transmitter 36. From this transmitter radio frequency pulses are transmitted from antenna 38 in all directions over a given radiation field. The cadence frequency of pulse generator 34 may be varied by adjustment thereof together with switch mechanism 46 which contacts different taps 31, 33 and 35 on pulse generator 34. Only three different pulse cadence frequencies are indicated for simplification of the illustration. It should be understood, however, that in actual practice the number of cadence frequencies used may be increased, as desired. During the time transmitter 36 is operating, it is desirable that the receiver 42 of the transmitter-receiver circuit be blocked. For this purpose pulses from generator 34 are applied over a blocker circuit 40 to receiver 42.

At the same time pulses are transmitted from transmitter 36, sweep circuit generators 50, 52 and 54, respectively, may be selectively energized to furnish sweep voltages to the horizontal deflection plates of cathode ray indicators 60, 62 and 64, respectively. Switch 46 may be selectively adjusted to bridge across contacts 31—41, 33—43 or 35—45, successively to energize the separate sweep circuits 50, 52 and 54, respectively.

Pulses transmitted from transmitter 36 over antenna 38 are repeated from such of repeaters 12, 14 and 16 in the field of radiation as may be tuned to the proper cadence frequency. These repeaters will be pulled into synchronism with the received pulses and will re-transmit pulses of the same cadence frequency to antenna 44 for reception and detection by pulse receiver 42. The detected pulses from the output of receiver 42 are applied over line 48 to the vertical deflecting plates of cathode ray indicators 60, 62 and 64. These received pulses will accordingly produce on the indicating screen of the cathode ray indicators along the sweep line a vertical deflection indicating the location of the plane. The screens may be calibrated in distance, taking into account the fixed delay which may be caused in repeating the signals.

Preferably, switch arm 46 is continuously operated by means of a driver mechanism 94 so that the separate indicators 60, 62 and 64 are alternately connected into circuit and at a high enough rate to maintain visual indication on the screens of all of the tubes. The indication of the separate categories of the craft as indicated by repetition rates or cadence frequencies can be obtained by observing which ones of indicators 60, 62 and 64 show a deflection of the beam during a sweep across the screen. Also, the indication of the particular individual objects in any given category may be obtained by observing the width of the pulses reproduced on the indicator screens. It should be noted that although the pulses received are applied to all cathode ray tubes simultaneously only that cathode-ray tube which receives the simultaneous synchronized sweep voltage will indicate the stationary received pulses. On the remaining cathode ray tube screen only a transient background of pulse signals will be observed. In this manner each screen will indicate only that series of pulses that correspond to repetition rate to which each individual indicator is synchronized.

The apparatus so far described, by itself, may be used to indicate the identity of various mobile objects such as aircraft if the transmitter-receiver equipment is at a ground station, or for repeater ground stations, if the transmitter-receiver equipment is mounted on a movable object. However, this arrangement necessitates continous observation of the various indicator screens.

To obviate the necessity of this continued observation, I may provide separate indicator lamps 70, 72 and 74, which lamps will be lighted only when an object bearing suitable repeater mechanism is within the radiation field of the transmitter-receiver unit. To this end the circuits for lamps 70, 72 and 74 may be completed through a switch arm 76, switch terminals 71, 73 and 75 and switch relay contacts 80, 82 and 84. Relay contacts 80, 82 and 84 are opened under the control of relay coils 86, 88 and 90, respectively, the contacts opening when the respective relay coils are energized. These relay coils are coupled to a mixer coupler circuit 92 which derives its energy from the output of filters 66 and 68 coupled to it over lines 69, 71, respectively. Separate taps 51, 53 and 55 are provided at filter 66 so that by movement of adjustable contact arm 58 the output of receiver 42 may be applied thereto over line 56. The separate taps of filter 66 serve to tune this filter to pass the frequency components corresponding to the desired repetition rate at which pulse generator 34 is tuned. Filter 68 is similarly made adjustable to pass the same frequency component as derived from the respective sweep generators 50, 52 and 54. The phase reverser 99 is utilized to insure the opposite phase of signals compared to the output filter 66. When components of the same frequency are applied over both filters 66 and 68 to mixer coupler 92, the difference in phase will be substantially 180 degrees due to the long repetition rate compared to the echo displacement and they will produce a zero beat frequency so that the relays will be deenergized permitting contacts 80, 82 and 84 to be closed. However, only one of the lamps 70, 72 and 74 will be lighted at any one time since switch 76 will complete the circuit for only one lamp at a time. When the pulse generator 34 is tuned to a particular cadence frequency and no craft are present to retransmit this signal, there will be no output energy from filter 66 and, as a consequence, the energy from filter 68 will be applied to the relays 86, 88 and 90, causing them to be energized. However, as soon as an object operating at the desired repetition rate is present and has been synchronized by the received pulses, energy will be applied over line 69 to neutralize the effect of energy from the sweep generators causing the relay to release the respective contact to closed position and the respective lamps to be lit. In operation of this system, it is desirable that switch arms 58, 76, 46 and the tuning switch for filter 68 be simultaneously operated as, for example, by the driver mechanism 94.

It is clear that, if desired, the operation of the switches may be made manually so that observation may be limited at will to any one of the desired cadence frequencies. It further should be clear that, if only a simple indication that a repeater operating at the particular cadence frequency is in the field of the transmitter-receiver system, lamps 70, 72 and 74 together with their operating circuits may be used without the additional cathode ray indicators 60, 62 and 64.

In Fig. 2 is illustrated a system similar to the transmitter-receiver arrangement of Fig. 1 but in this case a single cathode ray indicator is provided to indicate the identity of objects at the separate location instead of providing individual cathode ray indicators for each system. According to this arrangement, pulses from pulse generator 104 suitably adjusted in cadence frequency are transmitted over antenna 100 by means of radio frequency transmitter 102. Output pulses from generator 104 may be applied over blocking circuit 106 to pulse receiver circuit 108. If desired, pulse receiver circuit 108 may be adjustable so as to be responsive only to pulses received at a particular repetition rate. Simultaneously, with the production of pulses in filter 104, sweep generator 110 is energized to provide a sweep frequency wave for sweeping a cathode ray beam between the horizontal plates of a cathode ray indicator 112.

The objects in a particular category may be identified by giving to the reproduced pulses different characteristics. This may be accomplished, for example, by operating a square wave or dotting generator 116 in response to variations in the sweep frequency of sweep generator 110. These pulses may be applied to a control grid in cathode ray indicator tube 12 so that pulses may appear in different line form, for example, as shown as solid lines at 116A, dotted lines at 116B and dash lines at 116C.

It is clear, also, that in each of these categories the pulses may also be varied in width to identify different individual objects in each category. If desired, the additional indicators, as provided by lamps 136, 138 and 140, may be provided. For this control there are provided adjustable filters 118, 120 coupled to the output of receiver 108 and sweep generator 110, respectively, which apply energy to a mixing coupler 122 for furnishing the control energy for relay windings 124, 126 and 128. The lamp circuits are completed through adjustable switch mechanism 148, switch contacts 142, 144 and 146 and relay contacts 130, 132 and 134. The operation of this indicating system was described fully in connection with Fig. 1 and need not be repeated herein.

A clearer indication of the operation of the indicator 112 to provide the separate pulse indications and distance indications may be had by reference to the curves of Fig. 2A. In curves e, f and g, respectively, are shown in heavy line pulses P1, P2 and P3, respectively, being transmitted at different cadence frequencies. Associated with these pulses are shown the received repeated pulses P1R, P2R, and P3R, respectively. It will be noted that these repeated pulses are spaced different distances from the originating transmitting pulses indicating different distances of these objects from the transmitter-receiver equipment. As the pulse generator is tuned to the different cadence rates shown in curves e, f and g, the sweep generator is controlled to produce sweep voltage waves 51, 52 and 53 as shown in curves h, i and j. The distance along these respective sweeps at which pulse P1R, P2R and P3R will appear are shown diagrammatically on the same sets of curves.

It will be noted that pulse 116A, for example, of Fig. 2, is not broken up in dotted lines so, as a consequence, no dotting generator operator is needed for this pulse. However, pulse 116B is provided in relatively short dots. This dotting effect may be provided by operating dotting generator 116 in accordance to an adjustment of pulse generator 104 to produce a square wave output such as shown at D2, curve k, Fig. 2A. This voltage is applied as a negatively biasing voltage to the grid of indicator 112 causing the beam tracing the pulse to be intermittently applied to the screen producing the dotted effect on the image on the screen. For producing the dash effect, shown in curve 116C, the spacing between the dotting pulses may be changed, as indicated, at D3, curve i of Fig. 2A, by changing the adjustment of generator 116, this adjustment, of course, being ganged to pulse generator 104 for change when pulse cadence is changed. It should be noted that curves k and l of Fig. 2A are not drawn to the same time scale as the previous curves e through j. For purposes of illustration the dots and dashes indicated in curves k and l respectively, are shown considerably wider than would be actually used in practice. In order to produce the dotting of the pulse signals a sufficient number of these dotting (or dashing) pulses must occur during the time of the received pulse signal. Thus the widths of the dotting pulses indicated by the curves would of necessity be considerably narrower.

It will be noted here that while the suppressing bias on the grid is still maintained for the same period as the negative pulses of curve D2, the spacing between these pulses is considerably increased so that the beam will be effective for a longer period of time producing dashes instead of the short dots, as indicated in Fig. 2 at curve 116C.

It will be clear that for additional categories of planes to be indicated, other dotting frequencies may be provided so that a whole series of pulses appearing on the screen may be separately identified.

The system shown in Fig. 2 is generally preferable to that shown in Fig. 1 when it is desired to have the identifying equipment mounted on a mobile unit, particularly on a small unit such as an aircraft. However, where space is available, the identification of craft on separate indicating scales may be less confusing.

Particularly for use on aircraft, a much simplified form of identifying and distance indicating system, more fully described in my copending application, Serial No. 526,176, filed March 13, 1944, entitled "Distance measuring system," is shown in Fig. 3. According to this system, pulse generator 200 furnishes to a radio frequency transmitter 202 a series of pulses at certain pulse repetition rates. These same pulses may be applied over blocker 204 to block the receiver 206 during the periods of transmission of energy from 202.

Blocker circuit 204 is adjusted to block receiver 206 from reception of ordinary pulses but does not reduce the sensitivity sufficiently so that pulses from transmitter 202 will not be received. These transmitted pulses together with repeated pulses are then received on receiver 206. The pulses are applied to a trigger circuit 210. The first transmitted pulse triggers the circuit in one direction while the received pulse triggers it in the other direction producing in the output square wave pulses, such as shown at 210A. The duration of these pulses is determined by the time spacing between the transmitted pulse and the received pulse which serves as a measure of distance. These square wave pulses may then be applied to sawtooth generator 212 so that the leading edge initiates the production of a sawtooth wave while the trailing edge cuts off the wave, producing in the output of sawtooth generator 212 a train of sawtooth pulses shown at 212A whose amplitude varies with the width of the initiating pulse. These pulses may be applied over condenser 216 to a peak riding volt meter arrangement consisting of a diode 214 shunted by a high resistance 218. In the cathode circuit of diode 214 is provided volt meter 220 shunted by by-pass condenser 222. Because of the circuit constants of this arrangement, volt meter 220 will respond only to the peak voltages of the sawtooth waves. This peak voltage will vary in accordance with the time duration of pulses 210A. As a consequence, meter 220 may be calibrated directly in distance as indicated by the peak voltages of the applied sawtooth wave. This simple circuit may have advantages for use in aircraft, particularly where measurement of distance need not be critical.

It will be clear that the identity of craft may be obtained by the adjustment of pulse receiver 206 to respond only to pulses of the desired repetition rate. However, with this system, no provision is made for indicating different objects in the same category as by pulse width, for example.

While I have described certain specific embodiments of my invention, it should be distinctly understood that these circuits are given only by way of example to explain my invention and are not intended to be limitations on my invention, as set forth in the objects thereof and in the accompanying claims.

What is claimed is:

1. A system for identifying at one point, objects located at other points, comprising means at said one point for transmitting a plurality of series of pulses having different cadence frequencies, repeater means at each of said objects responsive to said pulses at different ones of said cadence frequencies for transmitting to said one point repeated series of pulses at its respective cadence frequency, means at said one point for receiving said repeated series of pulses and indicator means responsive to said received repeated series of pulses for producing indications identifying said objects.

2. A system according to claim 1, wherein said indicator means comprises filter means for separating the fundamental cadence frequencies representative of said different objects, and indicators operative in response to the separated fundamental frequencies.

3. A system according to claim 1, wherein several of said objects have repeater means responsive to a single one of said series of pulses at a given one of said cadence frequencies, said several objects having further means for giving to said repeated pulses separate identifying characteristics, said indicator means comprising means responsive to the cadence frequencies of said received series of pulses for indicating objects having repeater means operating at different cadence frequencies, and other means responsive to said separate identifying characteristics for identifying individual ones of said several of said objects.

4. A system according to claim 1, wherein said indicator means comprises a cathode ray indicator, means for producing sweep voltages in accordance with said cadence frequencies, to sweep the beam of said indicator in a predetermined path, and means responsive to said received series of pulses for producing a deflection of said beam along said path to indicate the identity of said objects.

5. A system according to claim 1, wherein several of said objects have repeater means responsive to a single one of said series of pulses at a given one of said cadence frequencies, said several objects having further means for giving to said repeated pulses separate identifying characteristics, said repeater means at separate of said other objects operating at different cadence frequencies, and other means at said one point responsive to said separate identifying characteristics for identifying individual ones of said several of said objects.

6. A method of identifying at one point objects located at other points comprising radiating from said one point a plurality of series of pulses having different cadence frequencies, repeating from different ones of said objects pulses of different ones of said cadence frequencies, receiving said different repeated pulses at said one point and producing indications identifying said objects in accordance with the cadence frequencies of the received repeated pulses.

7. A system for identifying at a relatively fixed location, mobile radio pulse repeater units operative in response to received pulses at different repetition rates, comprising means for transmitting pulse trains over a predetermined radiation field from said relatively fixed location, means for changing the repetition rates of the transmitted pulses to produce trains of pulses at different repetition rates for controlling different ones of said repeaters, receiver means at said location for receiving pulses repeated from mobile receiving units in said radiation field, and means for indicating the reception of pulses at the different repetition rates to indicate the identity of the mobile repeaters operating at different repetition rates.

8. A system according to claim 7 wherein said indicating means further comprises means for indicating the distance of said mobile repeater units as well as the identity thereof.

9. A system according to claim 7 in which certain of said repeaters operate at substantially the same repetition rates, and the individual ones of said certain of said repeaters are provided with means for repeating pulses with different characteristics, said indicating means further comprising means for indicating individual ones of said certain repeaters in response to the repeater pulses of said different characteristics.

10. A transmitter-receiver system for identifying repeater stations responsive at predetermined pulse repetition rates, comprising a pulse generator, adjustable generator control means for changing in a predetermined sequence the pulse repetition rate of pulses produced by said pulse generator, radio transmitter means for transmitting pulses from said pulse generator, receiver means for receiving repeated pulses from said repeater stations at the pulse repetition rates, indicator means, indicator control means controlled simultaneously with said generator control means for rendering said indicator means operative to indicate reception of pulses on said receiver means, and means for applying the received repeated pulses to said indicator means to indicate the reception of pulses at the various repetition rates, and thereby identify the repeaters by their pulse repetition rates.

11. A system according to claim 10, wherein said indicator means comprises a cathode ray indicator means, and said indicator control means comprises a sweep generator, said cathode ray indicator means further comprising means for applying pulses from said pulse generator to said sweep generator to initiate the sweep voltage thereof, whereby said indicator will indicate the distance as well as the identity of said repeater stations.

12. A system according to claim 10, wherein said indicator means comprises individual cathode ray indicators for each of said pulse repetition rates, and said indicator control means comprising separate sweep generators for each of said indicators, further comprising means for selectively coupling said sweep generators to said pulse generator in accordance with the adjustment of said generator control means.

13. A system according to claim 10, wherein said indicator means comprises a single cathode ray indicator, and said indicator control means comprises an adjustable sweep generator for said cathode ray indicator, further comprising means for controlling initiation of sweep voltages in response to pulses from said pulse generator, and means for adjusting said sweep generator in accordance with the adjustment of said pulse generator repetition rate.

14. A system according to claim 10, wherein said indicator means comprises individual lamps for each of said repetition rates, and said indicator control means comprises means for selectively preparing an operating circuit for said lamps in accordance with adjustment of said pulse repetition rate, means for deriving a control wave from said pulse generator to maintain the operating circuit of the selected lamp open in the absence of received signals at the selected repetition rate, and means responsive to received signals at the selected repetition rate for neutralizing the effect of said control wave, to close the circuit for said selected lamp, whereby the presence of a repeater station operating at said selected repetition rate is indicated.

15. A system for indicating at a single location the identity of radio repeater stations in the vicinity of said single location, comprising means for transmitting from said single location trains of pulses at given different repetition rates, means for repeating said trains from different ones of said repeater stations at selectively different ones of said repetition rates, and means for indicating at said location reception of said repeated pulses at the different repetition rates selectively to identify the repeaters.

16. A method of indicating at a single location the identity of objects in the vicinity of said location, comprising transmitting from said single location trains of pulses at different given repetition rates, repeating from different ones of said objects pulses at different ones of said repetition rates, receiving said repeated pulses at said given location, and producing an indication of the repetition rate of said received repeated pulses.

DONALD D. GRIEG.

REFERENCES CITED

The following references are of record in the file of this patent:

UNITED STATES PATENTS

| Number | Name | Date |
| --- | --- | --- |
| 2,134,716 | Gunn | Nov. 1, 1938 |
| 2,165,690 | Wademan | July 11, 1939 |
| 2,252,083 | Luck | Aug. 12, 1941 |